United States Patent [19]

Huille et al.

[11] 3,960,587

[45] June 1, 1976

[54] PHTHALOCYANINES, COMPOSITIONS DERIVED THEREFROM AND PROCESSES FOR THEIR PREPARATION

[75] Inventors: Michel Ernest Antoine Huille, Creil; Louis Antoine Cabut, Nogent-sur-Oise, both of France

[73] Assignee: Produits Chimiques Ugine Kuhlmann, Paris, France

[22] Filed: Feb. 19, 1974

[21] Appl. No.: 443,600

[30] Foreign Application Priority Data

Feb. 21, 1973   France .............................. 73.06040

[52] U.S. Cl. .......................... 106/288 Q; 106/308 N
[51] Int. Cl.$^2$ .......................................... C08K 5/34
[58] Field of Search .................... 106/288 Q, 308 N; 260/314.5

[56] References Cited
UNITED STATES PATENTS

| | | | |
|---|---|---|---|
| 3,754,958 | 8/1973 | Grambalvo | 106/288 Q |
| 3,764,360 | 10/1973 | Langley | 106/288 Q |

*Primary Examiner*—Winston A. Douglas
*Assistant Examiner*—J. V. Howard
*Attorney, Agent, or Firm*—Beveridge, Degrandi, Kline & Lunsford

[57] ABSTRACT

Compounds falling within the formula:

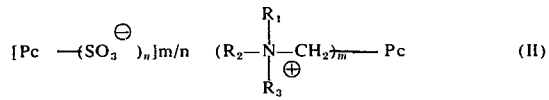

(II)

in which Pc represents the residue of a phthalocyanine, $R_1$ represents an alkyl group of low molecular weight or a cycloalkyl group, $R_2$ represents a hydrogen atom, an alkyl group of low molecular weight or a cycloalkyl group, $R_3$ represents a hydrogen atom or an alkyl group of low molecular weight, $R_1$ and $R_2$ or $R_1$, $R_2$ and $R_3$ may also form a heterocyclic residue with the nitrogen atom and m and n each represent a whole or fractional number from 1 to 4; mixture of phthalocyanine pigments comprising a phthalocyanine pigment unstable to flocculation or sedimentation and at least one compound of the above formula; process for the stabilization of a phthalocyanine pigment comprising incorporating therein at least one compound of the above formula; process for the preparation of a compound of the above formula comprising reacting a phthalocyanine-sulphonate of the formula:

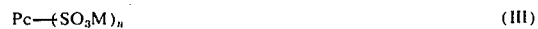

(III)

with an acetic solution of a phthalocyanine of the formula:

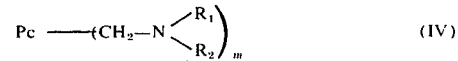

(IV)

or with an aqueuos solution of a phthalocyanine of the formula:

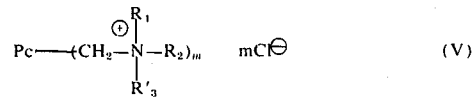

(V)

at the rate of ($n/m$ moles of phthalocyanine of formula (IV) or (V) to one mole of compound of formula (III) and the solid is filtered off, drained and dried, wherein Pc, $m$, $R_1$ and $R_2$ have the meanings given in claim 1, $R'_3$ represents either an alkyl group of low molecular weight or, together with $R_1$ and $R_2$, forms a heterocyclic residue and M represents sodium or potassium or the ammonium group, and paints, lacquers, ink and plastic material colored by means of a mixture of a phthalocyanine pigment unstable to flocculation or sedimentation and at least one compound of the above formula.

11 Claims, No Drawings

PHTHALOCYANINES, COMPOSITIONS DERIVED THEREFROM AND PROCESSES FOR THEIR PREPARATION

The invention relates to new phthalocyanines, to mixtures thereof with phthalocyanine pigments and to the stabilisation of such pigments to flocculation and sedimentation.

It is known that the phthalocyanine pigments, especially those from copper phthalocyanine, have the disadvantage of flocculating in paints and varnishes. This phenomenon appears particularly in paints containing titanium dioxide or other white mineral pigments and phthalocyanine pigments, above all in non-aqueous systems. Fairly small agglomerates of particles are formed which subdivide again to give the initial particles under the effect of not very large mechanical forces, for example, those coming into play in a spray gun, or owing to the effect of a modification of the interfacial tension. This results in considerable variations in the intensity of the shades when using such pigments. In the same way, when paints and printing inks containing phthalocyanine pigments are stored, the pigment particles have a tendency to aggregate in a manner which is sometimes irreversible and which has the effect of reducing the colouring power and the homogeneity of the paints and inks.

It is known that the flocculation in the paints and in the printing inks can be diminished by using phthalocyanines containing sulphonic or carboxylic groups which give a negative charge to the pigments. These negatively charged pigments flocculate with pigments charged positively, for example titanium dioxide. In these conditions, the intensity of colouring of a paint comprising titanium dioxide and a phthalocyanine pigment remains the same, whatever its means of application. Nevertheless, with such mixtures of pigments, a rapid sedimentation is produced and a lowering of the colour yield follows.

Furthermore, in French Patent No. 1,332,175 it is indicated that mixtures of phthalocyanine pigments are able to resist flocculation if 0.5 to 10 moles per cent of an aminomethylene-phthalocyanine corresponding to the general formula:

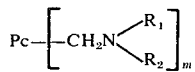

(I)

is incorporated, in which Pc represents a phthalocyanine radical, $R_1$ represents a hydrogen atom or a substituted or unsubstituted aliphatic hydrocarbon radical, $R_2$ represents a substituted or unsubstituted aliphatic hydrocarbon radical or forms with $R_1$ a heterocyclic nucleus, and $m$ is a whole number from 1 to 4. These aminomethylene-phthalocyanines, however, have the disadvantage of being soluble in aromatic solvents, such as toluene and xylene, and of being the cause of washing out when they are incorporated with phthalocyanine pigments. In particular, they reduce the behaviour to overvarnishing.

It has now been found that the flocculation and sedimentation can be prevented by mixing phthalocyanine pigments having a tendency to flocculate with at least one compound of the general formula:

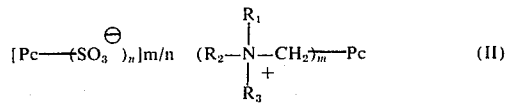

in which Pc represents the residue of a phthalocyanine, $R_1$ represents an alkyl group of low molecular weight or a cycloalkyl group, $R_2$ represents a hydrogen atom, an alkyl group of low molecular weight or a cycloalkyl group, $R_3$ represents a hydrogen atom or an alkyl group of low molecular weight, $R_1$ and $R_2$ or $R_1$, $R_2$ and $R_3$ being also able to form with the nitrogen atom a heterocyclic residue, $n$ represents a whole or fractional number from 1 to 4, preferably 1, and $m$ represents a whole or fractional number from 1 to 4, preferably from 2 to 3.

The compounds of general formula (II) are new and form part of the invention.

By "alkyl groups of low molecular weight" are meant more particularly those containing 1 to 6 carbon atoms. The cycloalkyl groups contain preferably 6 carbon atoms. As heterocyclic residues formed by $R_1$ and $R_2$ or by $R_1$, $R_2$; and $R_3$ with the nitrogen atom, may be mentioned more particularly those of pyridine or quinoline.

The phthalocyanine of residue Pc may be metallised or not but Pc is preferably the residue of copper phthalocyanine. Phthalocyanines to be stabilised are especially the copper phthalocyanine in its $\alpha$, $\beta$, $\gamma$, $\epsilon$, $\delta$ or R forms and the halogenated derivatives of the latter.

The $\alpha$, $\gamma$, $\epsilon$, $\delta$ and R forms are not stable as regards the growth of the crystals and the recrystallisation in another form, i.e. the $\beta$ modification and this disadvantage can be avoided in a satisfactory manner by known means, for example by adding monochlorophthalocyanine or else phthalocyanines having as the central atom certain atoms other than that of copper, for example an atom of tin or aluminium, or by using methods described in U.S. Pat. Nos. 3,764,361, 3,754,955 and 3,767,442.

The new compounds of formula (II) may be prepared, for example, by reacting a sulphonate of phthalocyanine of the formula:

with an acetic solution of a phthalocyanine of the formula:

or with an aqueous solution of a phthalocyanine of the formula:

at the rate of ($n/m$) moles of phthalocyanine of formula (IV) or (V) to one mole of a compound of formula (III), wherein Pc, $m$, $n$, $R_1$ and $R_2$ have the meanings given above and $R'_3$ represents an alkyl group of low molecular weight preferably containing 1 to 6 carbon atoms or, together with $R_1$ and $R_2$ forms a heterocyclic residue, and M represents an atom of sodium or potassium or the ammonium group.

When a phthalocyanine of formula (IV) is used, a compound of formula (II) is obtained in which $R_3$ represents a hydrogen atom. When a phthalocyanine of formula (V) is used, a compound of formula (II) is obtained in which $R_3$ represents an alkyl group of low molecular weight or together with $R_1$ and $R_2$ forms a heterocyclic residue.

The compounds of formula (III) may be prepared by known processes, for example, by direct sulphonation of the phthalocyanine by means of oleum or by synthesis from sulphophthalic anhydride. Advantageously, they contain one sulphonic group.

The aminomethylene-phthalocyanines of formula (IV) and the quaternary ammonium salts of formula (V) may be prepared by known processes, for example, by reacting a chloromethyl phthalocyanine with an amine of the general formula:

in which $R_1$, $R_2$ and $R_3$ have the same significance as above.

Examples of compounds of general formula (II) are the cuprophthalocyanine-monosulphonate of tris-(dimethyl-aminomethyl)-cuprophthalocyanine, the cupro-phthalocyanine-monosulphonate of tris-(diethylamino-methyl)-cuprophthalocyanine, the cuprophthalocyanine-monosulphonate of tris-(cyclohexyl-aminomethyl)-cuprophthalocyanine, the cuprophthalocyanine- disulphonate of tris-(dimethylaminomethyl)-cuprophthalocyanine, the cuprophthalocyanine-monosulphonate of tris-(trimethylammoniummethyl)-cuprophthalocyanine, and the cuprophthalocyaninemonosulphonate of tris-(pyridiniomethyl)-cuprophthalocyanine.

The pigmentary mixtures according to the invention may be prepared for example by incorporation. The incorporation of the stabilising compound of formula (II) in the phthalocyanine pigment to be stabilised may be effected for example by simple mixing of the pigment in aqueous suspension at the ambient temperature, filtration, draining and drying; or else by dry grinding in the presence of a salt, taking up in hot water to eliminate the salt and filtration; or by kneading the pressed pastes with the stabilising compound; or by precipitating the compound of formula (II) on the phthalocyanine pigment to be stabilised by the introduction of an acetic solution of a phthalocyanine of formula (IV) in the form of the acetate or of an aqueous solution of a phthalocyanine of formula (V) in a suspension of the phthalocyanine to be stabilised in an aqueous solution of a phthalocyanine sulphonate of formula (III), fltering, draining and drying.

The pigmentary mixtures according to the invention preferably comprise by weight 1% to 20% of the compound of formula (II) and, more paticularly, 2% to 10%, based on the total weight of pigmentary mixture.

The pigmentary mitures according to the invention are stable with regard to flocculation and sedimentation in varnishes and paints. They also have the advantage of having a good resistance to bleeding, since the compounds of formula (II) are completely insoluble, not only in water, but also in all the organic solvents used in paints and inks. They are very fast to overvarnishing. This property is verified by the absence of migration of the pigments into the white paint masking a region coloured with a paint based on a pigmentary mixture according to the invention.

The invention is illustrated by the following Examples in which the parts and percentages are by weight.

EXAMPLE 1

2 parts of sodium cuprophthalocyanine-monosulphonate are dissolved in 300 parts of water, and the mixture is stirred until solution is complete, then 50 parts of a copper phthalocyanine pigment (beta form) are added in the form of a filter cake having a content of dry extract of 36%, obtained by grinding a crude copper phthalocyanine in the presence of a mineral salt such as sodium sulphate or calcium chloride, and of an organic solvent such as tetrachlorethylene. The suspension is stirred for 4 hours at 55°–60°C. so as to obtain a homogenous mixture to which is added a solution of 0.95 parts of copper tris-(dimethylamino-methyl)-phthalocyanine acetate in 20 parts of water. After complete precipitation of the cuprophthalocyanine-sulphonate of copper tris(dimethylamino-methyl)-phthalocyanine on the copper phthalocyanine pigment, the pigmentary composition obtained is filtered off, washed, dried and finely ground.

The pigmentary mixture obtained does not flocculate in alkyd paints. Further, it shows a good fastness to overlacquering and does not bleed into dilute acid and alkaline solutions.

The control of the stability to flocculation can be effected by applying the A.S.T.M. 965 D test. For this purpose the pigmentary mixture is dispersed in a glycerophthalic paint in the presence of titanium oxide by means of a grinder of the Red Devil type. The differences of intensity between the applications of this paint and that of the same paint when rubbed are noted. The difference of colour intensity is measured by the difference in optical density by means of a densitometer ("Quantalog").

A negative result indicates that the crude paint has an intensity lower by X% than that of the rubbed paint, which signifies a predominating flocculation of the coloured pigment.

The following Table summarises the results obtained with the pigmentary mixture according to the invention compared with those obtained with the non-stabilised phthalocyanine pigment or the same pigment stabilised by the addition of cuprophthalocyanine-monosulphonic acid or of tris-(dimethylaminomethyl)-cuprophthalocyanine.

| | Long oil paint 68% | | Medium oil paint 53% | |
|---|---|---|---|---|
| | Initial application | Application after 21 days | Initial application | Application after 21 days |
| Non-stabilised pigment | −49 | −44 | −70 | −72 |
| Pigment stabilised by addit- | −18 | 0 | −26 | −10 |

|  | Long oil paint 68% | | Medium oil paint 53% | |
|---|---|---|---|---|
|  | Initial application | Application after 21 days | Initial application | Application after 21 days |
| ion of cuprophthalocyanine-monosulphonic acid Pigment stabilised by addition of tris-(dimethylamino-methyl)-cuprophthalycyanine | +5 | +17 | −19 | −14 |
| Pigmentary mixture of Example 1 | −3 | +11 | +2 | +10 |

The results of this test show the excellent resistance to flocculation of the pigmentary mixture according to Example 1. Compared with the pigments stabilised by the incorporation of cuprophthalocyanine-monosulphonic acid or tris(dimethylamino-methyl)cuprophthalocyanine, it also has a very distinctly better resistance to bleeding in acid or basic medium as well as in the presence of solvents.

EXAMPLE 2

If, in the preceding Example, one uses quantities or sodium cupro-phthalocyanine-monosulphonate and tris-(dimethylamino-methyl)cuprophthalocyanine which are twice as small as used in Example 1 then a pigmentary mixture is obtained which has an excellent fastness to sedimentation and to interpigmentary separation in alkyd paints.

The resistance to flocculation is very distinctly improved compared with that of the initial pigment.

EXAMPLE 3

1 part of sodium cuprophthalocyanine-monosulphonate is dissolved at ambient temperature in 300 parts of water. After solution is complete, 75 parts of a copper phthalocyanine pigment containing 3% of chlorine are added, in the form of a filter cake having a content of 26% dry extract. The suspension is stirred for 4 hours at 55°–60°C. and then a solution of 0.5 parts of copper tris-(diethylamino-methyl)phthalocyanine acetate in 10 parts of water is added. The pigmentary composition thus obtained is filtered off, washed, dried at 75°C. and ground. When it is incorporated in the presence of rutile titanium oxide in an alkyd paint, a paint is obtained which has an excellent behaviour in the A.S.T.M. 965 D test.

EXAMPLE 4

25 parts of crude cupiferous phthalocyanine and 2.5 parts of the compound of formula:

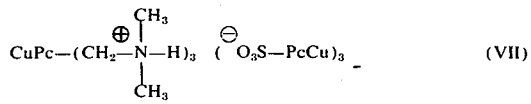

(VII)

are ground with 100 parts of aliminium sulphate and 8 parts of trichlorethylene for 48 hours. The ground mass is diluted in 4000 parts of water containing 40 parts of hydrochloric acid, heated for 2 hours at 90°–95°C., the suspension is filtered, and the solid washed until the sulphate ions in the filtrate disappear, the filter cake is dried at 75°C. and is then pulverised. A pigmentary composition is thus obtained which is stable to flocculation in alkyd paints.

Analogous results are obtained if one replaces the compound of formula (VII) by the compound of formula:

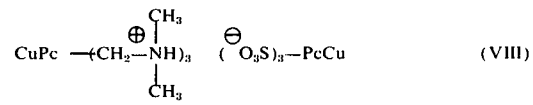

(VIII)

The compound of formula (VII) may be prepared in the following manner: 20.3 parts of sodium cuprophthalocyaninemonosulphonate are dissolved in 500 parts of water, the solution is heated to 60°C. and a solution of 9.3 parts of tris(dimethylamino-methyl)cuprophthalocyanine acetate in 50 parts of water is slowly added. The precipitate is filtered off, washed and dried at 60°C. 27 parts of a blue product are obtained, the analysis of which gave the following results:

|  | Cu % | N % | S % |
|---|---|---|---|
| Found: | 9.1 | 16.4 | 4 |
| Calculated for the formula (VII) | 9.32 | 16.4 | 3.52 |

The compound of formula (VIII) may be prepared in the same way, utilising a solution of 17.6 parts of sodium cuprophthalocyaninetrisulphonate in 250 parts of water and adding thereto a solution of 18.5 parts of tris-(dimethylamino-methyl)-cuprophthalocyanine acetate. The precipitate is filtered off, washed and dried and has the following analytical composition:

|  | Cu % | N % | S % |
|---|---|---|---|
| Found | 8.3 | 16.1 | 5 |
| Calculated for the formula (VIII) | 8.15 | 17 | 6.15 |

EXAMPLE 5

25 parts of a cupriferous phthalocyanine (alpha form) prepared by solution of a crude copper phthalocyanine in sulphuric acid and reprecipitation in water are introduced into a solution of 1 part of sodium cuprophthalocyanine-monosulphonate in 500 parts of water. The suspension is heated at 60°C. for 4 hours and a solution of 0.5 parts of tris-(dimethylaminomethyl)cuprophthalocyanine acetate is slowly introduced therein. The mixture is then stirred for 2 hours at 60°C., the solid filtered off, washed and dried at 75°C. A pigmentary composition of a reddish blue shade is obtained which is stable to sedimentation and to flocculation in alkyd paints, and particularly stable with respect to aromatic solvents.

EXAMPLE 6

500 parts of a filter cake containing 20% of dry extract of a copper phthalocyanine pigment containing 3% of chlorine and about 65% of which is in the beta form and 35% in the alpha form, are kneaded for about four hours in a mixer of the Werner type with 20 parts of an aqueous paste containing 25% of dry extract, of cuprophthalocyanine-sulphonate of tris-(dimethylaminomethyl)-cuprophthalocyanine. When the mixture is homogeneous, the paste is dried at 75°C. and then finely ground. The pigmentary composition thus prepared is stable to flocculation in alkyd media, as well as to recrystallisation in the presence of aromatic solvents.

EXAMPLE 7

3.75 parts of the sodium salt of a cupriferous phthalocyanine monosulphonate are dissolved in 800 parts of water. When solution is complete, 150 parts of a phthalocyanine pigment in the epsilon form are introduced as a filter cake having a 30% content of dry extract, the preparation of which has been described in German Patent No. 1,181,248. The suspension is stirred for 4 hours at 55°–60°C. so as to obtain a homogeneous suspension; if desired the homogeneity of the suspension can be completed by passing it into a sand grinding mill of the "Draiss" type. The cuprophthalocyaninesulphonate of tris-(dimethylamino-methyl)cuprophthalocyanine is precipitated by the slow addition of a solution of 1.75 parts of tris-(dimethylamino-methyl)-cuprophthalocyanine acetate in 25 parts of water. The mixture is stirred for 2 hours and 2 parts of tris-(2,3,5-trimethyl-phenoxy-methyl)cuprophthalocyanine are added, the preparation of which has been described in Examaple 2 of French Patent No. 2,114,243. Stirring is continued for 2 hours at 55°–60°C. and the suspension is then filtered, and the solid washed and dried. A pigmentary composition of reddish shade is obtained which has an excellent fastness to flocculation and sedimentation, as well as to recrystallisation in paints.

EXAMPLE 8

6.5 parts of the sodium salt of cuprophthalocyaninemonosulphonic acid are dissolved in 1200 parts of water. When solution is complete, 270 parts of a phthalocyanine pigment in the beta form are introduced as a filter cake having a content of dry extract of 34%. The suspension is stirred for 24 hours at 45°–50°C., heated to 60°C. and the cuprophthalocyaninemonosulphonate of tris-(trimethylammoniamethyl)-cuprophthalocyanine is precipitated by the slow addition of a solution of 3.125 parts of tris-(trimethyl-ammoniamethyl)-cuprophthalocyanine chloride in 125 parts of water. The product is filtered off, washed, dried and finely ground. The pigmentary composition thus obtained has a good stability to flocculation in paints.

An analogous result is obtained if one replaces the tris-(trimethylammoniamethyl)-cuprophthalocyanine chloride by tris-(pyridinio-methyl)-cuprophthalocyanine chloride.

The following Table summarises the results obtained in the A.S.T.M. 965 D test as described in Example 1 with the pigmentary mixtures of Examples 3, 5 and 6 compared with those obtained with the corresponding non-stablilised phthalocyanine pigments.

|  | Long oil paint 68% | | Medium oil paint 53% | |
|---|---|---|---|---|
|  | Initial application | Application after 21 days | Initial application | Application after 21 days |
| Pigmentary mixture of Example 3 | +2 | +5 | +2 | +3 |
| Corresponding non-stabilised phthalocyanine pigment | −25 | −21 | −39 | −28 |
| Pigmentary mixture of Example 5 | 0 | +3 | −3 | +2 |
| Corresponding non-stabilised phthalocyanine pigment | −52 | −48 | −50 | −49 |
| Pigmentary mixture of Example 6 | +3 | +7 | +2 | +2 |
| Corresponding non-stabilised phthalocyanine pigment | −14 | −21 | −16 | −18 |

We claim:
1. Mixture of phthalocyanine pigments which comprises a phthalocyanine pigment unstable to flocculation or sedimentation and 1% to 20% of at least one compound of the formula:

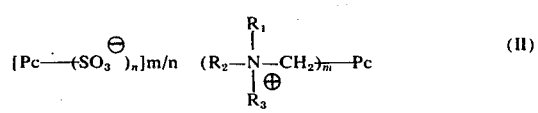

in which Pc represents the residue of a phthalocyanine, $R_1$ represents an alkyl group of low molecular weight or a cycloalkyl group, $R_2$ represents a hydrogen atom, an alkyl group of low molecular weight or a cycloalkyl group, $R_3$ represents a hydrogen atom or an alkyl group of low molecular weight, $R_1$ and $R_2$ or $R_1$, $R_2$ and $R_3$ may also form a heterocyclic residue with the nitrogen atom and $m$ and $n$ each represent a whole or fractional number from 1 to 4.

2. A process for the stabilisation of a phthalocyanine pigment in which the phthalocyanine pigment to be stabilised and 1% to 20% of at least one compound of the formula (II) given in claim 1 are mixed in aqueous suspension at ambient temperature, filtered off, drained and dried.

3. A process for the stabilisation of a phthalocyanine pigment in which the phthalocyanine pigment to be stabilised and 1% to 20% of at least one compound of the formula (II) given in claim 1 are ground dry in the presence of a water-soluble mineral salt, the mixture is dispersed in hot water and filtered.

4. A process for the stabilisation of a phthalocyanine pigment in which 1% to 20% of a compound of the formula (II) given in claim 1 is precipitated on the phthalocyanine pigment to be stabilised by the introduction of an acetic solution of a phthalocyanine of the formula:

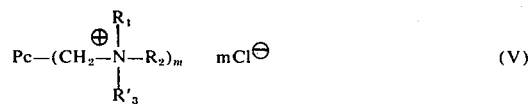

in the form of the acetate or of an aqueous solution of a phthalocyanine of the formula:

into a suspension of the phthalocyanine to be stabilised in an aqueous solution of a phthalocyanine sulphonate of the formula:

$$Pc\text{-}(SO_3M)_n \qquad (III)$$

at the rate of $n/m$ moles of phthalocyanine of formula (IV) or (V) to one mole of compound of formula (III) and the solid is filtered off, drained and dried, wherein Pc, $m$, $R_1$ and $R_2$ have the meanings given in claim 1, $R'_3$ represents either an alkyl group of low molecular weight or, together with $R_1$ and $R_2$, forms a heterocyclic residue and M represents sodium or potassium or the ammonium group.

5. A mixture according to claim 1 in which, in the compound of formula (II) $m$ is a whole or fractional number from 2 to 3 and $n$ is 1.

6. A mixture according to claim 1 in which, in the compound of formula (II), any alkyl group present contains 1 to 6 carbon atoms.

7. Mixture according to claim 1 in which the phthalocyanine pigment is copper phthalocyanine in its $\alpha$, $\beta$, $\gamma$, $\epsilon$, $\delta$ or R form or a halogenated derivative thereof.

8. A mixture according to claim 1 in which, in the compound of formula (II), any cycloalkyl group present contains six carbon atoms.

9. Mixture according to claim 1 containing by weight 2% to 10% of the compound of the formula (II) based on the total weight of the mixture.

10. A mixture according to claim 1 in which, in the compound of formula (II), any heterocyclic residue present is pyridine or quinoline.

11. A mixture according to claim 1 which comprises copper phthalocyanine and cuprophthalocyanine-sulphonate of copper tris-(dimethylamino-methyl)-phthalocyanine.

* * * * *